United States Patent [19]

Dearlove et al.

[11] Patent Number: 4,459,398

[45] Date of Patent: Jul. 10, 1984

[54] HIGH STRENGTH ONE-PART EPOXY ADHESIVE COMPOSITION

[75] Inventors: Thomas J. Dearlove, Troy; Richard P. Atkins, Rochester, both of Mich.

[73] Assignee: General Motors Corporation, Detroit, Mich.

[21] Appl. No.: 498,933

[22] Filed: May 27, 1983

[51] Int. Cl.³ .............................................. C08G 59/54
[52] U.S. Cl. ......................................... 528/1; 528/94; 528/103; 528/116; 528/117
[58] Field of Search ...................... 528/94, 103, 103.5, 528/116, 117, 1

[56] References Cited

U.S. PATENT DOCUMENTS 3,553,166  1/1971  Anderson et al. .................. 528/117
4,040,994  8/1977  Lewis et al. ...................... 528/103.5

Primary Examiner—Earl A. Nielsen
Attorney, Agent, or Firm—Elizabeth F. Harasek

[57] ABSTRACT

A one-part epoxy adhesive has been developed that cures rapidly at relatively low elevated temperatures and is based on a diglycidyl ether of bisphenol A (DGEBA), DGBE reacted with glycerol and natural oils, and a unique triple catalyst system of metal imidazole salt, dicyandiamide and a cyclic latent curing agent that liberates diethylenetriamine when heated.

3 Claims, 9 Drawing Figures

| CURVE | CURE TEMP (°C) | TIME TO PEAK EXO. (MIN) |
|---|---|---|
| A | 130 | 8 |
| B | 140 | 3 |
| C | 150 | 1.75 |
| D | 160 | 1 |

HIGH STRENGTH ONE-PART EPOXY ADHESIVE COMPOSITION

This invention relates to storage stable, one-part, epoxy adhesives that are rapidly curable at elevated temperatures. More particularly, the invention relates to adhesives that are specially adapted for use on automotive assembly lines to adhesively bond metal and/or polymeric parts.

BACKGROUND

Current automotive designs incorporate both steel and molded polymeric component parts. Typically, the metal components are made of stamped sheet steel. Major polymeric body components are compression molded polyester sheet molding compound (SMC) or reaction injection molded (RIM) urethane. A preferred method of joining such steel and polymeric parts to each other is to use a rapidly curable but strong adhesive. Generally, bond strengths of at least 25,000 kiloPascals are required for joining steel. Acrylic and polyurethane adhesives are rapidly curable and initially provide such bond high strengths. However they cannot generally tolerate paint oven temperatures of 180° C. and higher encountered when the final paint coat is applied.

Bond strengths greater than 25,000 kiloPascals are also attainable with two-part epoxy compositions. In a two-part system, the epoxide resin and curative constituents are separately measured out and mixed immediately before use. Such measuring and mixing make them undesirable for assembly line operations.

In order to take advantage of the bond strength of epoxies but to avoid the measuring and mixing steps, considerable effort has been directed towards the development of a suitable one-part epoxy adhesive. This necessarily entails the use of a latent catalyst or curative that is substantially inert to epoxy cure reactions at room temperature but which will cure rapidly at elevated temperatures.

We sought to develop a one-part epoxy adhesive for assembly line use. The criteria it had to meet included a shelf life at room temperature (about 25° C.) of 30 to 90 days, a cure in four minutes or less at a temperature between about 130° and 150° C. and an ability to withstand exposure to temperatures up to about 200° C. without substantial loss of bond strength. As a practical matter, these properties of long shelf life, high temperature resistance and rapid cure are mutually exclusive. Improving one of them causes a deterioration of one or both of the others.

For example, dicyandiamide

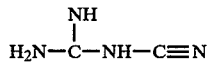

or DICY is known to be an excellent latent curing agent or catalyst for epichlorohydrinbisphenol A (DGEBA) based epoxy resins. However, temperatures well over 150° C. are needed to activate the DICY and effect cure in a matter of a few minutes. The addition of an imidazole salt to a DICY-containing composition is known to lower its cure temperature and increase its cure rate, but it also lowers bond strength.

OBJECTS

Accordingly, it is an object of this invention to provide a novel, storage stable, heat curable, one-part epoxy resin. A further object is to provide such epoxy with a room temperature shelf life of at least 30 days and a cure rate for a bonding layer of four minutes or less at 150° C. Another object is to provide such adhesive with a bond strength of at least about 25,000 kiloPascals measured immediately after cure and to maintain at least about 75% of such strength when the bond is later exposed to temperatures up to 200° C.

A more particular object is to provide a novel combination of epoxy based constituents and curatives to accomplish these ends. More specifically, it is desired to provide a flexibilized epoxy based on epichlorohydrin and bisphenol A resin, the viscosity of which may be adjusted by the incorporation of a suitable epoxy diluent. It is a further object to provide a catalyst system that is a new and effective combination of dicyandiamide (DICY), metal salt imidazole complex and a latent curing agent that liberates diethylenetriamine at cure temperatures.

BRIEF SUMMARY

In accordance with a preferred embodiment, these and other objects may be accomplished as follows. The formulation is based on the reaction product of epichlorohydrin and bisphenol A. This is a common epoxy resin that is sometimes referred to as a diglycidyl ether of bisphenol A or DGEBA. Unmodified DGEBA is relatively brittle, so a suitable amount of an epoxy flexibilizer is added. A preferred flexibilizer is based on aromatic epoxy resin prereacted with saturated fatty acid ester.

In order to improve the workability of our flexibilized DGEBA composition before cure, its viscosity is lowered with an epoxy diluent. A preferred such diluent is a polyfunctional, aliphatic epoxy resin.

In accordance with this invention, we have discovered a novel combination of curing agents which allow the epoxy system described above to meet the criteria of shelf life, cure time and temperature, and heat resistance we have set for an automotive adhesive for assembling line use on polymers or steel. The curing agents include DICY, a complex of an imidazole with a metal salt (preferably nickel or copper) and a latent curing agent complex that liberates diethylenetriamine at the elevated cure temperature. The preferred latent curing agent complex has the structure

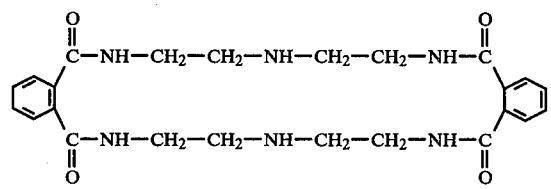

When all three agents are incorporated in suitable proportions in the epoxy mixture, the resultant composition has a shelf life of several months, a cure time less than four minutes at 130°–150° C. and excellent resistance to degradation at 200° C.

Our invention will be better understood in view of the following drawings, detailed description, and examples.

DETAILED DESCRIPTION

TABLE I

Materials

| Tradename | Description | Remarks | Vendor |
|---|---|---|---|
| DER 330 | Bisphenol A - epichlorohydrin based epoxy resin | Viscosity = 7,000–10,000 mPa·s | Dow Chemical Co. |
| EpiRez 5132 | Flexibilizer based on an aromatic epoxy resin and a saturated fatty acid ester | Viscosity = 50,000 mPa·s | Celanese Coatings Co. |
| Araldite 508 | Mixture of 35% DER 330 and 65% glycidyl ether capped polyglycol | Viscosity = 2,000–5,000 mPa·s | Ciba-Geigy Corp. |
| EpiRez 5048 | Trifunctional aliphatic epoxy diluent | Viscosity = 150 mPa·s | Celanese Coatings Co. |
| HY939 | 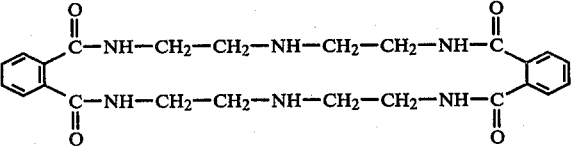 | Latent epoxy curing agent from which diethylenetriamine is liberated upon heating.* | Ciba-Geigy Corp. |
| Dicyandiamide (Dicy) | 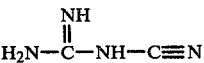 | Latent epoxy curing agent (mp 207–8° C.) | |
| CuSO$_4$—2MI Ni(NO$_3$)$_2$—Im | 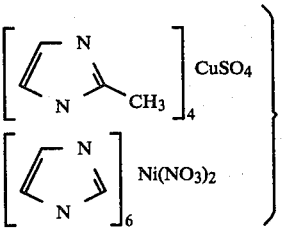 | Latent epoxy curing agent which dissociates on heating | |

*Labelled Hy940 when supplied as a mix in an epoxy resin.

Figure 1:
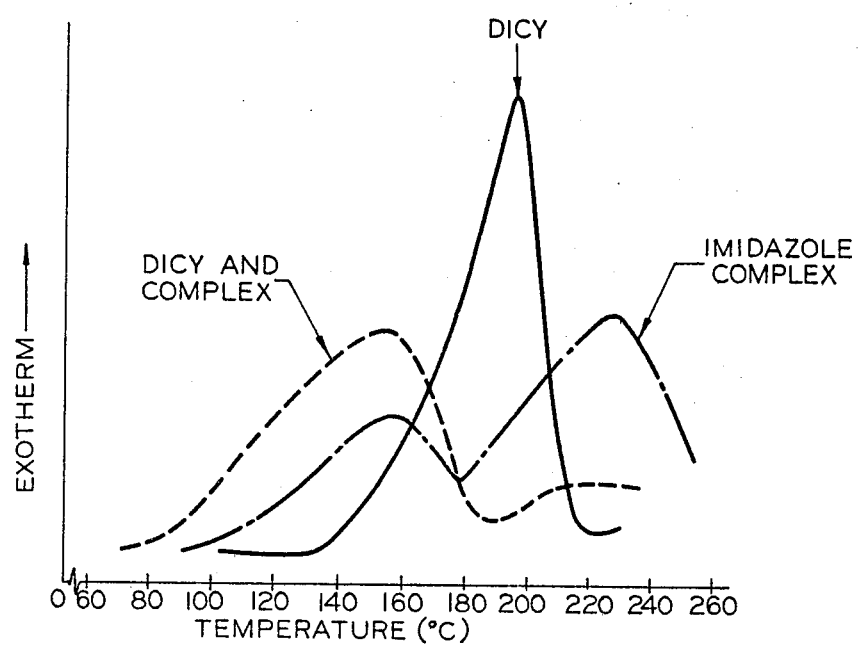
FIG. 1 is a differential scanning calorimeter trace for a DGEBA epoxy adhesive cured with three separate curing agent systems.

Referring to Table I, all materials with the exception of the metal imidazole complexes were obtained from commercial sources. The HY940 curing agent and dicyandiamide catalyst were always handled carefully to reduce exposure to air or atmospheric moisture. All other materials were used as received.

The metal imidazole complexes were synthesized as follows. A solution of 68 g (1.0 mole) of imidazole dissolved in 250 ml of methanol was placed in a one liter round bottom flask fitted with a ground glass stirrer and dropping funnel. A solution of 48.5 g (0.17 mole) of Ni(NO$_3$).6H$_2$O predissolved in 100 ml of methanol was add to the stirred reaction flask over a 0.5 hour period. The same procedure was followed for the synthesis of the CuSO$_4$ - 2-methylimidazole complex except that 82 g (1.0 mole) of 2-methylimidazole was dissolved in 250 ml of methanol and 62.4 g (0.25 mole) of CuSO$_4$.5H$_2$O was predissolved in 100 ml of water.

A precipitate formed almost immediately, and after an additional 0.5 hour of stirring at room temperature, the majority of the solvent was removed using a rotary evaporator. The solid was collected by suction filtration, washed with several portions of methanol and dried in a vacuum desiccator at 70° C. The yield for all preparations varied between 70 to 90% depending on the extent of washing during the suction filtration and the solubility of the complex in the reaction solvent.

Prior to dispersing the imidazole complexes and DICY into the epoxy resins, they were pulverized in a Micromaster Jet Pulverizer to a particle size less than about 10 microns. We found that this facilitated dispersion of these constituents into the epoxy resins.

Our initial study of catalyst cure rates was based on unmodified epichlorohydrin-bisphenol A (DGEBA) resin. The particular resin we employed was DER 330 sold by Dow Chemical Company. DER 330 has an epoxy equivalent weight of approximately 175 to 185, and a viscosity at about 25° C. of about 7,000 to 10,000 milliPascal seconds. There are many equivalent DGEBA resins that are readily available. Most commercial processes of making DGEBA resins yield a liquid product having a molecular weight of approximately 380.

While DGEBA resins alone generally provide good adhesive characteristics, they are brittle after cure. In the automotive adhesive environment, it is probable that an adhesive joint will be subjected to sharp impacts and some relative motion between bonded panels. Therefore, it is desirable to improve the tensile and modulus properties of base DGEBA resin. This is what is accomplished in our invention by the addition of an epoxy flexibilizer based on aromatic epoxy resin reacted with a saturated fatty acid ester.

A preferred flexibilizer is Epi Rez 5132, marketed by Celanese. Epi Rez 5132 has an epoxy equivalent weight of about 400 to 450 and a viscosity at 25° C. of about 40,000 to 60,000 milliPascal seconds. This resin belongs to a family of glycidyl ether resins based on bisphenol A reacted with glycerol and one or more natural oils such as cashew nut oil. They are known to add flexibility to and lower the softening temperatures of DGEBA epoxies.

In order to decrease the viscosity and thereby increase the workability of the subject system, a reactive aliphatic epoxy diluent was added. One such diluent is Araldite 508 marketed by Ciba-Geigy Corporation which is a mixture of about 35% DER 330 and 65% glycidyl ether capped polyglycol. Araldite 508 has a viscosity of about 2,000 to 5,000 milliPascal seconds at room temperature. Another reactive diluent employed was Epi Rez 5048 which is a trifunctional aliphatic epoxy diluent with a viscosity of about 150 milliPascal seconds at room temperature. There are many known reactive epoxy diluents. Those suitable for this invention preferably have a viscosity less than about 500 milliPascal seconds at 25° C. The preferred ones for this invention are monoepoxy molecules of low viscosity epoxy resins. They include such compositions as alkyl phenol or cresol glycidyl ethers and styrene oxide. Such diluents are known to provide significant viscosity reduction at relatively low concentrations. However, they generally adversely affect the cured properties of a DGEBA or other epoxy composition in which they are contained. Generally, an epoxy diluent is recommended only when the adhesive in which it is reacted will see a maximum use temperature less than 95° C. However, we have unexpectedly discovered that we can retain exceptionally good adhesive properties at temperatures up to 200° C. even though such epoxy diluents are incorporated.

A novel combination of three epoxy curing agents lies at the heart of our invention. The first cure constituent is dicyandiamide (DICY) which has the chemical structure

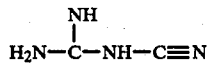

DICY has long been used in one part epoxy systems because it is substantially nonreactive at room temperature (about 25° C.). DICY first becomes an effective cure catalyst at relatively high temperatures. FIG. 1 plots the results of differential scanning calorimetry studies where the temperature within the calorimeter was increased at a rate of 20° C. per minute. DICY alone in DGEBA resin exhibits a peak exotherm at 180° C. The exotherm is created by the cross linking reaction of the epoxy.

The second curative constituent of our system is a metal salt imidazole complex. Imidazoles are known curing agents for epoxy resins. Forming a metal salt complex of an imidazole decreases its activity with respect to the epoxy cure reaction at room temperature. At elevated temperatures, the imidazole complex dissociates into the metal salt and the imidazole constituent. The imidazole then reacts to promote the rapid cure of the epoxy resin. Referring again to FIG. 1, it can be seen that the imidazole complex used to cure DGEBA resin by itself shows double activation peaks. The first cure exotherm occurs at a temperature of about 150° C. and the second at a temperature of about 220° C.

Clearly, for automotive applications, the use of either DICY or imidazole complex alone as a curative requires too high a cure temperature. The combination of DICY and imidazole complex exhibits a peak exotherm at about 150° C. This is a little better than either constituent alone, but still higher than desired for the application.

The third curative constituent is HY940, a co-curing agent marketed by Ciba-Geigy. The idealized structure of the curative in HY940 is

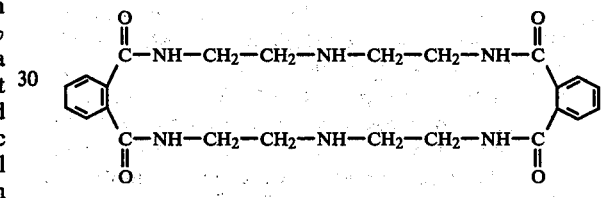

Its CAS registry number is 68003-28-1, its formula is $C_{24}H_{30}N_6O_4$, and its IUPAC name is Dibenzo(i,t)(1,4,7,12,15,18)hexaazacyclodocosine-5,13,18,26 (6H,19H)-tetrone(9CI), SB=7,8,9,10,11,12,20,21,22,23, 24,25-dodecahydro-. Ciba-Geigy designates the undiluted compound as HY939. The curative, as sold, contains about 41 weight percent HY939 and the balance DGEBA. HY940 effects epoxy cure by the dissociation of the HY939 constituent upon heating to liberate diethylenetriamine (DETA). DETA is a highly effective and rapid curing agent for DGEBA resins. DETA by itself is a rapid curing agent for two-part epoxy systems: i.e., those in which the epoxy and curative are first mixed immediately before use.

The gist of our invention will be better understood in view of the following examples. Common conditions for each example are set forth immediately hereafter.

For a typical formulation pulverized metal imidazole complex and DICY were predispersed in DER 330 using a Cayuga Model LVS 10-1 pigment disperser. The disperser was operated at 3500 revolutions per minute. A 36 mm diameter Teflon disk, 7.7 mm thick, was mounted the mixer shaft.

Desired amounts of the other constituents were added to this mixture. The temperature within the mixing vessel was maintained below about 100° C. to prevent premature cure. The adhesives were degassed for one hour at 45° C. under a vacuum of approximately 1 mm of mercury in an indented glass resin kettle with a turbine blade stirrer.

In order to determine the bulk properties of the epoxy composition, sheets 4 mm thick were cast. A Teflon release agent was sprayed on an aluminum plate measuring 305 mm by 305 mm by 3.175 mm. Use of an aluminum metal plate promotes dissipation of heat generated by cure exotherms not matched by polymeric molds. The cast sheets were cured in an oven maintained at 177° C. for 60 minutes. A metal shield was placed around the molds while they were in the oven in order to deflect circulating air and provide indirect heating to the mold.

Lap shear strength determinations were made on steel coupons measuring 101.6 mm by 25.4 mm by 2.2 mm. The coupons were vapor blasted prior to application of adhesives. A bonding area of 323 mm$^2$ with an adhesive thickness of 0.127 mm was employed. The samples were cured at the temperatures and times reported in each of the following examples in overall accordance with ASTM D1002-72.

Both tensile strength and flexural strength measurements were obtained from specimens cut from the cast sheets. An initial rough cut was made using a diamond saw. These coupons were then finally cut in a TENSILKUT apparatus. The tensile strengths were determined in accordance with ASTM D638-72 and the flexural strengths in accordance with ASTM D790-71.

EXAMPLE 1

Referring to Table II, experiments were run to determine the curative effect of metal imidazole salts on DGEBA (DER 330) and DGEBA with Araldite 508 diluent. Ten parts by weight of metal imidazole salt were added per 100 parts DGEBA resin. Lap shear measurements were taken on steel coupons as described above. The adhesive was cured at 177° C. for 30 minutes. The lap shear strength of the control sample was taken shortly after cure. Other lap shear samples were retained in a salt spray cabinet where they were subjected to a 5% aqueous salt solution at 100° C. for four weeks.

TABLE II

Formulations and Lap Shear Strength as a Function of Salt Spray Exposure for Imidazole Complex Cured Epoxy Resins

| | Formulations (parts by wt.) | | | |
|---|---|---|---|---|
| | 1 | 2 | 3 | 4 |
| Components | | | | |
| DER 330 | 100 | 100 | 100 | 100 |
| Araldite 508 | — | — | 37.5 | 37.5 |
| CuSO$_4$—2 MI | 10 | — | 10 | — |
| Ni(NO$_3$)$_3$—Im | — | 10 | — | 10 |
| Lap Shear Strength (kPa) | | | | |
| Control | 18,100 | 23,750 | 25,500 | 28,500 |
| 4 weeks salt spray | 12,500 | 17,050 | 13,750 | 21,600 |
| Strength Change (%) | −31 | −28 | −52 | −24 |

It can be deduced from Table II that the nickel nitrate-imidazole complex provided better adhesive strength than the copper sulfate-2-methyl imidazole complex. The nickel salt also showed less deterioration due to exposure to salt spray. The incorporation of the Araldite 508 diluent unexpectedly increased rather than decreased the lap shear strength of the adhesive. However, the formulation containing the Araldite 508 and the copper sulfate-2-methylimidazole complex showed unacceptable deterioration in salt spray.

EXAMPLE 2

Referring to Table III, in addition to Araldite 508 two other flexibilizers, Estane 5713 and Epi Rez 5132, were incorporated in DER 330 resin along with nickel nitrate-imidazole complex. The aim was to maximize lap shear strength.

TABLE III

Formulations and Properties of Systems Cured with Nickel Nitrate—Imidazole Complex

| | Formulations (parts by wt.) | | | |
|---|---|---|---|---|
| Components | 2 | 5 | 6 | 7 |
| DER 330 | 100 | 100 | 100 | 100 |
| Araldite 508 | — | 35 | — | — |
| Estane 5713 | — | — | 20 | — |
| EpiRez 5132 | — | — | — | 100 |
| Ni(NO$_3$)$_2$—Im | 10 | 10 | 10 | 10 |
| Lap Shear Strength (kPa) | 23,750 | 28,500 | 24,350 | 32,000 |
| Time to Peak Exotherm (DSC) at 130° C. | | 7–8 minutes | | |

Neither the DER 330 with the nickel nitrate-imidazole complex (Formulation 2) nor the DER with the estane diluent and nickel-nitrate imidazole salt (Formulation 6) exhibited adequate lap shear strength for our purposes. Moreover, the time to peak exotherm as determined by differential scanning calorimetry at 130° C. was 7 to 8 minutes. The desired cure rate was 4 minutes or less.

EXAMPLE 3

In an effort to increase the rate of cure of the epoxy resins, a two-constituent cure system of HY940 and nickel nitrate-imidazole complex was examined.

TABLE IV

Formulations and Properties of Systems Cured with HY940 and Nickel Nitrate—Imidazole Complex

| | Formulations (parts by wt.) | | | | |
|---|---|---|---|---|---|
| Components | 2 | 8 | 9 | 10 | 11 |
| DER 330 | 100 | 100 | 100 | 100 | 100 |
| Araldite 508 | — | — | 35 | 35 | — |
| EpiRez 5132 | — | — | 13 | — | 100 |
| HY940* | — | 100 | 25 | 10 | 10 |
| Ni(NO$_3$)—Imidazole | 10 | — | 10 | 10 | 10 |
| Lap Shear Strengths (kPa) | 23,750 | 6,800 | 28,000 | 29,000 | 33,650 |
| Time to Peak Exotherm (DSC) at 130° C. | | Approximately 6 minutes | | | |

*The amounts given for all components except HY940 are parts by weight. The HY940 is a stoichiometric curing agent and the number given for it is percent of stoichiometry. The calculation was based on the epoxide equivalent weights for the resins used in the formulation.

Referring to Table IV, incorporating at least 10 parts HY940 and 10 parts of nickel nitrate-imidazole complex into either a flexibilized or non-flexibilized DGEBA resin provided adequate lap shear strength. However, the time to peak exotherm using differential scanning calorimetry at 130° C. was approximately 6 minutes; this is still longer than the 4 minutes desired cure cycle for automotive applications.

The lap shear strength of DER 330 flexibilized with Epi Rez 5132 and cured with HY940 and nickel nitrate-imidazole complex was an exceptionally high 33,650 kiloPascals. However, when the samples of these formulations were evaluated for storage stability, it was found that they did not have the desired shelf life.

EXAMPLE 4

As DICY is a well known latent curing agent for epoxy resins, and it is known to be most effective when used with an accelerator, the combination of DICY and metal salt imidazole complex was examined. The compositions, lap shear strength and time to peak exotherm using DSC at 130° C. are set out in Table V.

TABLE V

Formulations and Properties of Systems Cured with DICY and Nickel Nitrate—Imidazole Complex

|  | Formulations (parts by wt.) | | | | |
|---|---|---|---|---|---|
| Components | 12 | 13 | 14 | 15 | 16 |
| DER 330 | 100 | 100 | 100 | 100 | 100 |
| Araldite 508 | 35 | — | — | — | — |
| EpiRez 5132 | — | 35 | 100 | 200 | 100 |
| Dicy | 10 | 10 | 10 | 10 | 10 |
| $Ni(NO_3)_2$—Im | 1 | 1 | 1 | 1 | 10 |
| Lap Shear Strength (kPa) Cured at 177° C. | 27,850 | 20,650 | 24,800 | 26,300 | 22,750 |
| Time to Peak Exotherm (DSC) at 130° C. (min) | ≈6 | ≈6 | ≈6 | ≈6 | ≈4 |

It can be seen that the incorporation of about 10 parts DICY and 10 parts nickel nitrate-imidazole complex decreased the time to peak exotherm to about 4 minutes, i.e., at the upper limit of the desired cure time. However, the lap shear strength of the adhesive bond, measured on steel coupons as described above, was adversely effected.

Summarizing the results of the first four examples, it can be determined that the use of DICY alone as a curing agent in a DGEBA resin affects virtually no cure at 130° C. Use of HY940 alone provides a cure time of about 5 minutes but at a lap shear strength of only 6,000 to 8,000 kiloPascals. The use of nickel nitrate-imidazole by itself provides a lap shear strength of 25,000 to 30,000 kiloPascals, but the cure time is excessively high at about 8 minutes. The combination of DICY and HY940 does not affect cure of DGEBA resin at 130° C. The combination of DICY and nickel nitrate-imidazole complex provides moderate lap shear strength, in the range of about 15,000 to 25,000 kiloPascals, and a cure time of about 4 to 6 minutes. The combination of HY940 and nickel nitrate-imidazole complex provides slightly improved lap shear strengths of 25,000 to 26,000 kiloPascals but a cure time of at least about 6 minutes.

Our invention rests in a new, unique combination of DICY, HY940 and metal salt imidazole complex that is described in the following examples.

EXAMPLE 5

Referring to Table VI, the lap shear strength and time to peak exotherm are reported for compositions containing DER 330 and Epi Rez 5132 epoxies. The curative system contained HY940, DICY and nickel nitrate-imidazole complex. The highest lap shear strength was obtained for the composition containing 100 parts DER 330, 100 parts Epi Rez 5132, 10 parts HY940, 10 parts DICY and 1 part nickel nitrate-imidazole. The amounts given for all the components except HY940 are in parts by weight. The amount of HY940 is a stoichiometric percent of the total epoxide groups present in the compositions before cure based on the epoxy equivalent weights of the combined epoxy constituents.

TABLE VI

Preliminary Evaluation of Three Catalyst System as a Function of EpiRez 5132 Level

|  | Formulations (parts by wt.) | | | |
|---|---|---|---|---|
| Components | 17 | 18 | 19 | 20 |
| DER 330 | 100 | 100 | 100 | 100 |
| EpiRez 5132 | 35 | 100 | 200 | 100 |
| HY940* | 10 | 10 | 10 | 10 |
| Dicy | 10 | 10 | 10 | 10 |
| $Ni(NO_3)_2$—Im | 1 | 1 | 1 | 10 |
| Lap Shear Strength (kPa) Cured at 177° C. | 28,750 | 33,000 | 30,000 | 24,500 |
| Time to Peak Exotherm (DSC) at 130° C. (Min) | ≈8 | ≈8 | ≈8 | ≈2.5 |

*The amounts given for all components except HY940 are parts by weight. The HY940 is a stoichiometric curing agent and the number given for it is percent of stoichiometry. The calculation was based on the epoxide equivalent weights for the resins used in the formulation.

Figure 2:
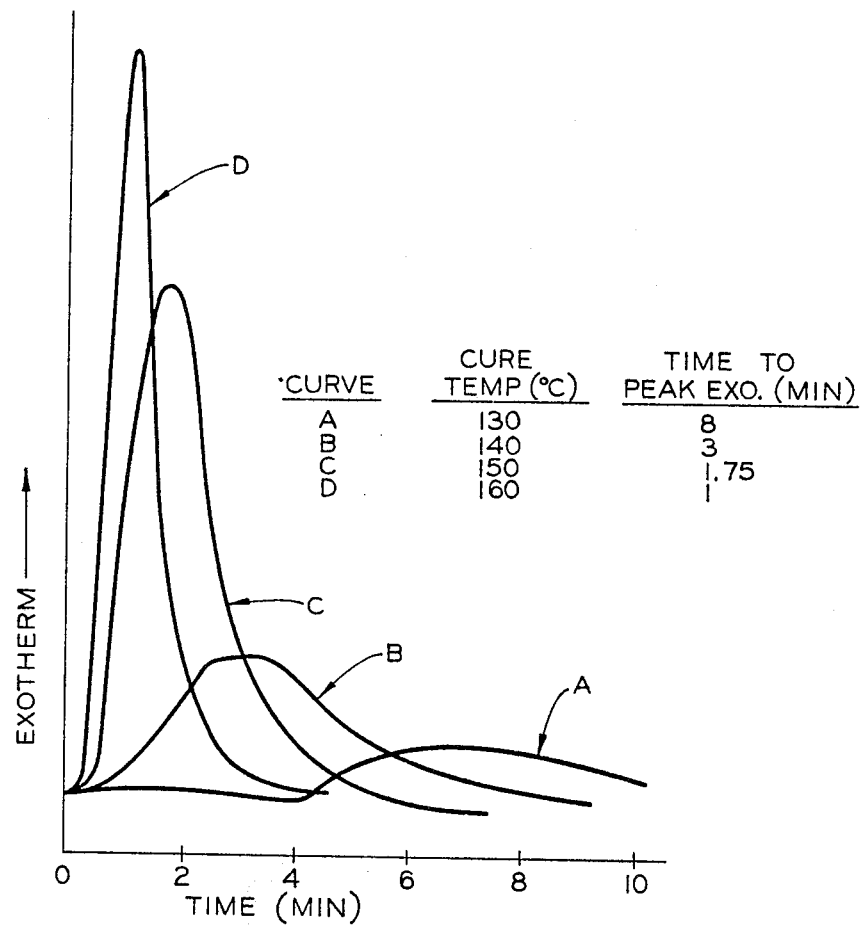
FIG. 2 is a differential scanning calorimeter trace of cure rate for DGEBA epoxy resin catalyzed with HY940, DICY and a nickel nitrate-imidazole complex.

In that such good lap shear strength was obtained using the three combined curing agents, the cure rate as a function of time was examined by differential scanning calorimetry for cure temperatures of 130, 140, 150 and 160° C. The results are shown at FIG. 2. At the desired cure temperature of 130° C., the time to peak exotherm was 8 minutes, a cure time too slow to meet automotive assembly line usage.

EXAMPLE 6

Figure 3:
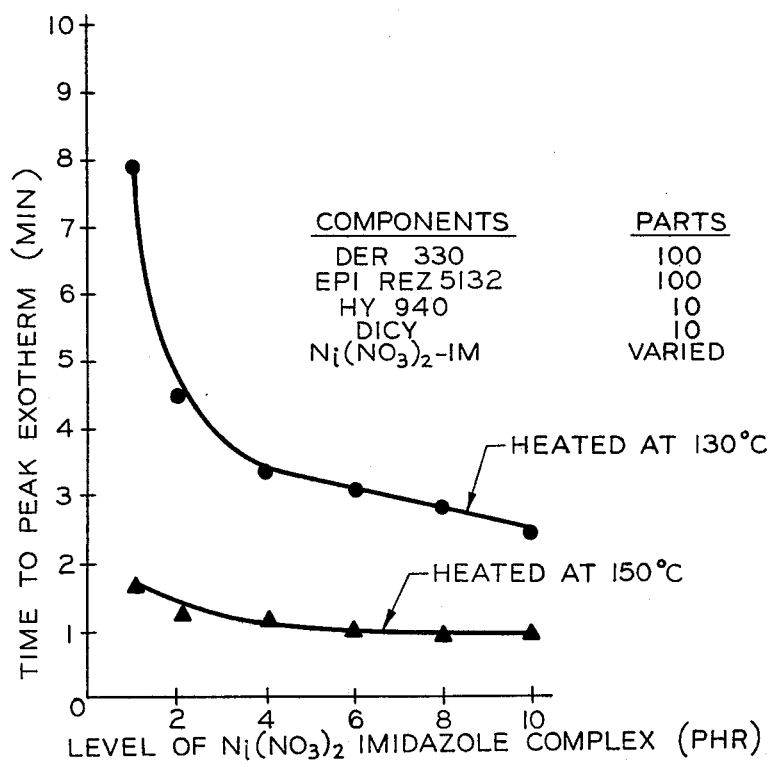
FIG. 3 is a plot of time to peak exotherm as measured by isothermal differential scanning calorimetry as a function of nickel nitrate-imidazole complex level and cure temperature for a flexibilized DGEBA resin.

In view of the excellent adhesive strength of Formulation 18 from Table VI of Example 5, a series of experiments was run to determine the effect of nickel nitrate-imidazole complex concentration on the cure rate of mixtures of DER 330, Epi Rez 5132, HY 940 and DICY. Referring to FIG. 3, it is apparent that increasing the concentration of the imidazole complex has relatively little effect on DGEBA cure rate at a temperature of 150° C. However, the effect of increasing the concentration of the complex from 1 to 2 parts at a cure temperature of 130° C. makes a very substantial difference in cure time. In fact, a concentration of at least 2 parts by weight imidazole salt per 100 parts of the epoxy resins effects a cure of the epoxy composition, characterized by a DSC peak exotherm, of 4 minutes or less at 130° C.

EXAMPLE 7

Figure 4:
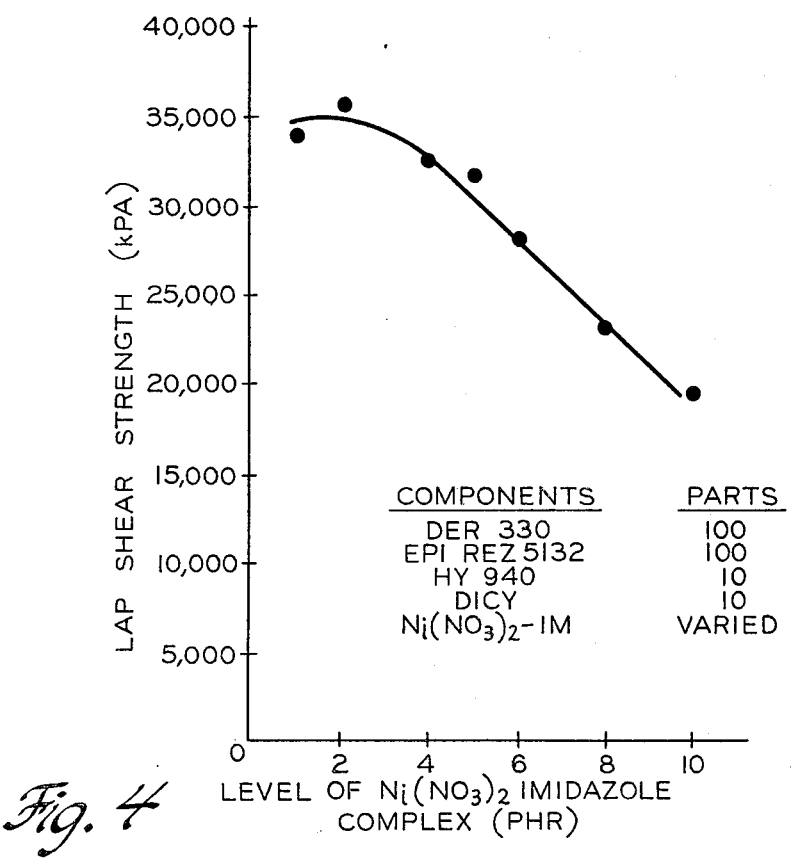
FIG. 4 is a plot of lap shear strength for formulations of flexibilized DGEBA resin cured with a combination of HY940, DICY and a nickel nitrate-imidazole complex.

In view of the rapid cure provided by the inclusion of about 2 to 10 parts nickel nitrate-imidazole with 10 parts each of HY 940 and DICY, determinations of lap shear strength as a function of nickel nitrate-imidazole complex concentration were made. The lap shear steel coupon samples were prepared as set forth above and the epoxy adhesive was cured at 177° C. for 30 minutes. Referring to FIG. 4 it is apparent that the lap shear strength decreases as the concentration of nickel nitrate-imidazole complex increases. However, concentrations less than 8 parts per 100 resin of the complex provides lap shear strengths greater than 20,000 kiloPascal.

In order to determine the effect of high temperatures on the triple catalyst compositions, the tensile samples were placed in an oven maintained at 200° C. for 1 hour.

TABLE VII

Lap Shear Strength as a Function of Nickel Nitrate—Imidazole Level and Cure Temperature

|  | Formulations (parts by wt.) | | |
|---|---|---|---|
| Components | 18 | 21 | 20 |
| DER 330 | 100 | 100 | 100 |
| EpiRez 5132 | 100 | 100 | 100 |
| HY940* | 10 | 10 | 10 |

TABLE VII-continued

Lap Shear Strength as a Function of Nickel Nitrate—Imidazole Level and Cure Temperature

| Dicy | 10 | | 10 | | 10 | |
|---|---|---|---|---|---|---|
| Ni(NO$_3$)$_2$—Im | 1 | | 5 | | 10 | |
| Lap Shear Strength (kPa)** Initial Cure Temperature (°C.) | Initial | After Abuse | Initial | After Abuse | Initial | After Abuse |
| 130 | 33,950 | 32,100 | 36,150 | 35,400 | 33,000 | 20,250 |
| 140 | 32,900 | 31,150 | — | — | 30,250 | 24,325 |
| 150 | 32,650 | 30,250 | 37,100 | 37,100 | 26,850 | 21,000 |
| 177 | 33,750 | 32,750 | 33,250 | 32,050 | 24,800 | 18,700 |

*The amounts given for all components except HY940 are parts by weight. The HY940 is stoichiometric curing agent and the number given for it is percent of stoichiometry. The calculation was based on the epoxide equivalent weights for the resins used in the formulation.
**Initial cure for 30 minutes
Abuse cycle was 1 hour at 200° C.

Referring to Table VII, the lap shear strength in kiloPascals for formulations Nos. 18, 21 and 20 were reported after initial cure and after the heat treat. The composition containing 10 parts of the nickel nitrate-imidazole salt showed unacceptable loss of lap shear strength after the 200° C. cycle. However, the formulations containing 5 and 1 part of nickel nitrate-imidazole complex showed only an acceptable small loss of shear strength after high temperature abuse.

EXAMPLE 8

Figure 5:
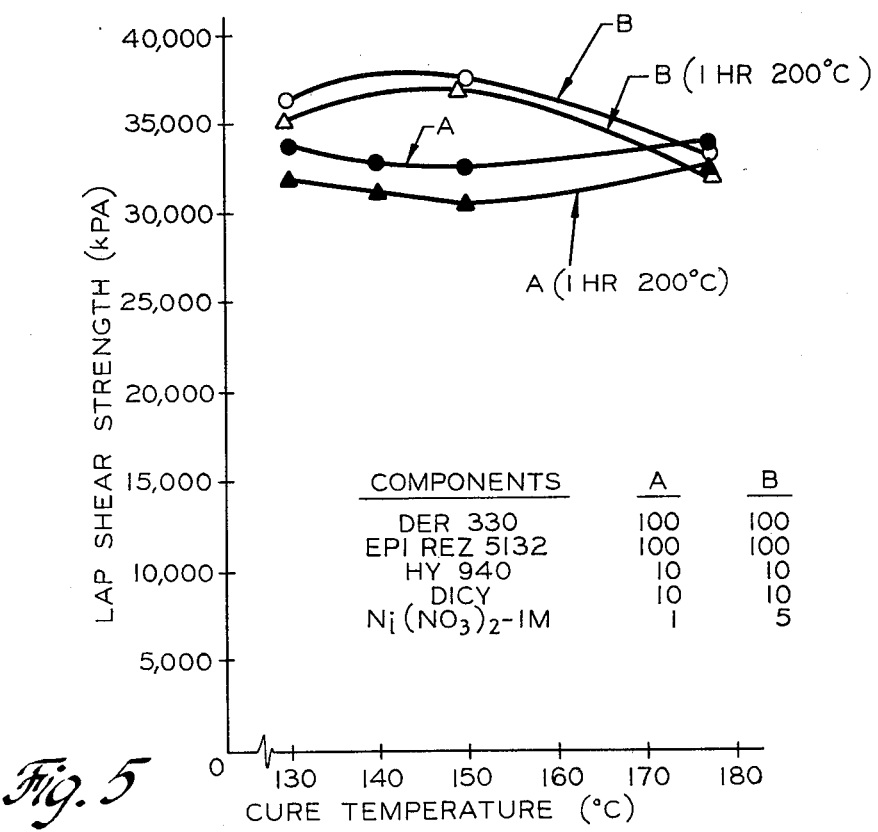
FIG. 5 is a plot of tensile strength as a function of nickel nitrate-imidazole complex level and cure temperature for flexibilized DGEBA resin.

Two triple catalyst epoxy resins of the formulations set out in FIG. 5 were tested to determine lap shear strength as a function of cure temperature. The only difference in the compositions is that formula A contained 1 part nickel nitrate-imidazole complex while composition B contained 5 parts nickel nitrate-imidazole complex. The formulation containing 5 parts imidazole showed better cure at lower temperatures, i.e. under 150° C. than the composition containing only one part imidazole. The lap shear strength of samples cured at 177° C. were about the same for both compositions.

Figure 6:
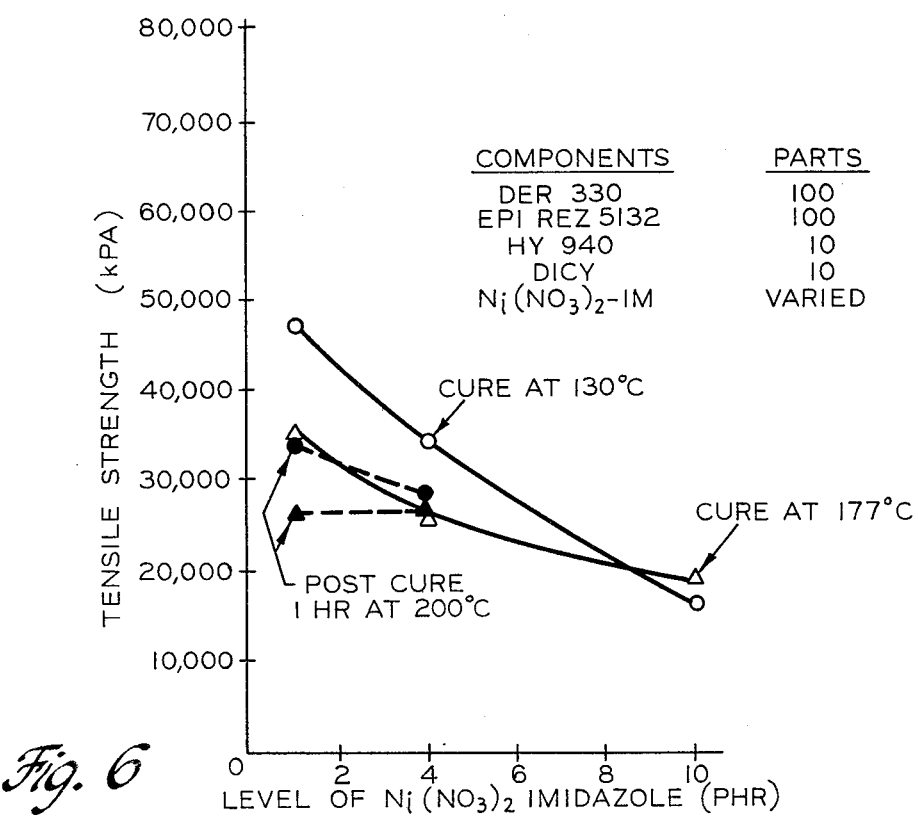
FIG. 6 is a plot of flexural strength as a function of nickel nitrate-imidazole complex level and cure temperature for flexibilized DGEBA resin.
Figure 7:
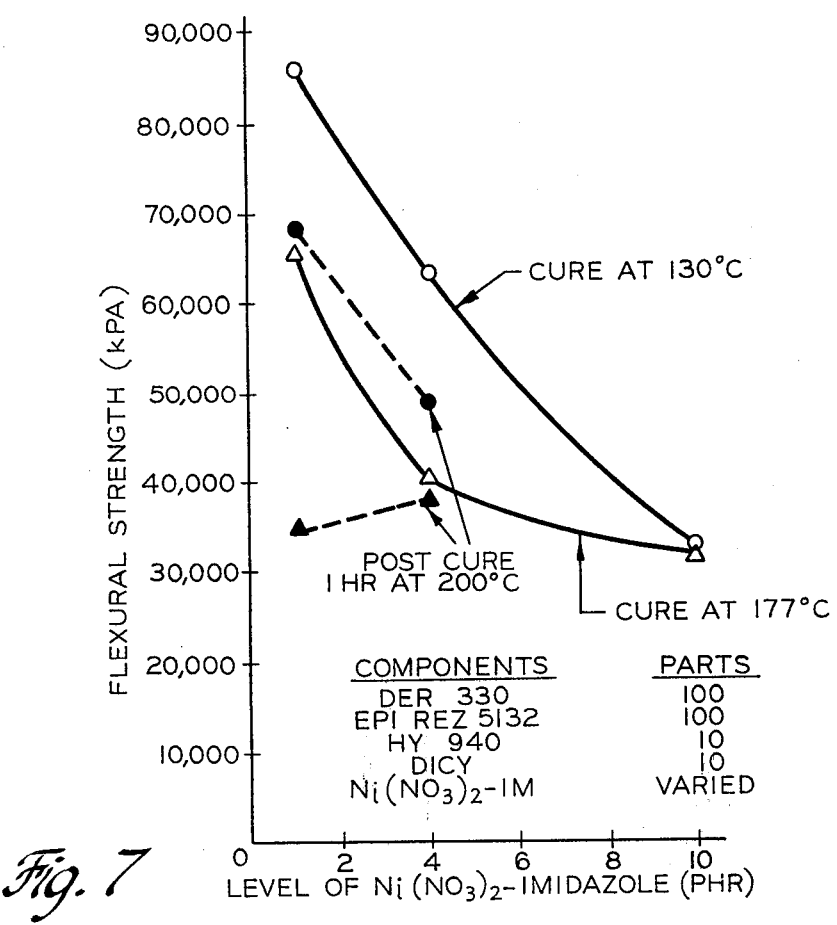
FIG. 7 is a plot of lap shear strength as a function of trifunctional epoxy diluent level and cure temperature for flexibilized DGEBA resin.

FIGS. 6 and 7 relate to the tensile strength and flexural strength of the indicated compositions as a function of nickel nitrate-imidazole complex level and cure temperature. The tensile strength and flexural strength seem to be optimum at lowest levels of nickel nitrate-imidazole complex. However, the properties are very acceptable at levels of 4 parts per 100 of resin.

EXAMPLE 9

Experiments were run to determine the effect of a reactive diluent on the epoxy formulations described in the preceding Examples 5 to 8. We wanted to incorporate a reactive diluent in order to reduce the viscosity of the uncured resin. This would allow the addition of fillers and further improve adhesive and high temperature properties.

Figure 8:
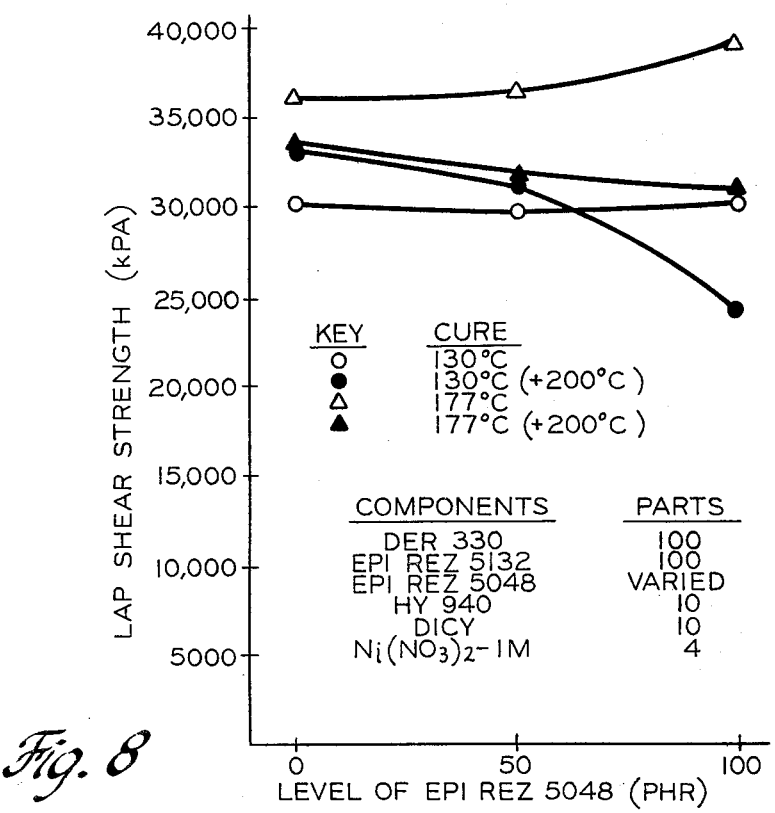
FIG. 8 is a plot of tensile strength as a function of trifunctional epoxy diluent and cure temperature for flexibilized DGEBA resin.

The diluent we examined was Epi Rez 5048 which has a very low viscosity of 150 milliPascal seconds at 25° C. The lap shear strengths of the formulations containing levels of 0, 50 and 100 parts Epi Rez 5048 are shown in FIG. 8. Very high strengths were obtained for examples cured at 177° C. (36,000 kiloPascals), and at a cure temperature of 130° C. strengths on the order of 30,000 kiloPascals were achieved. After maintaining the samples at 200° C. for 1 hour, the strengths of all samples tended to be in the 32,000 to 33,000 kiloPascal range except for one sample set which contained 100 parts Epi Rez 5048 per 100 parts DGEBA resin at 130° C. and post cured at 200° C.

Figure 9:
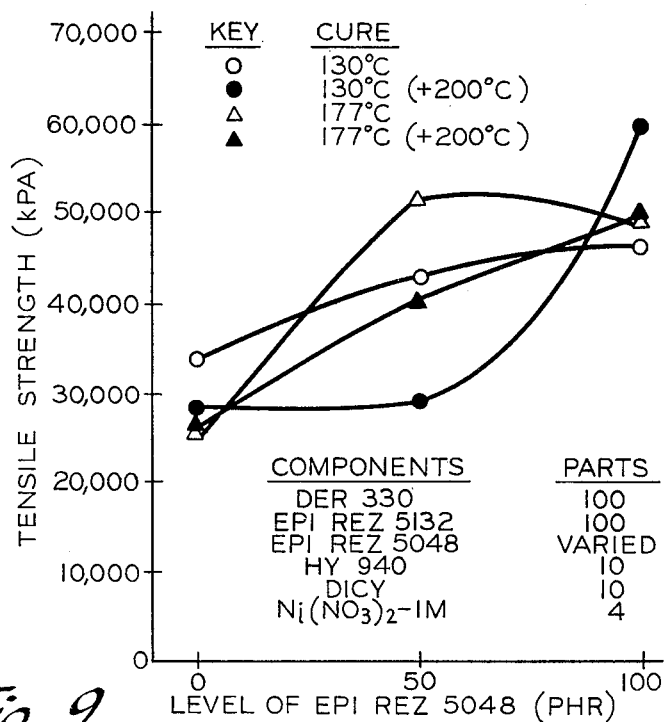
FIG. 9 is a plot of flexural strength as a function of trifunctional epoxy diluent level and cure temperature for flexibilized DGEBA resin.
Figure 10:
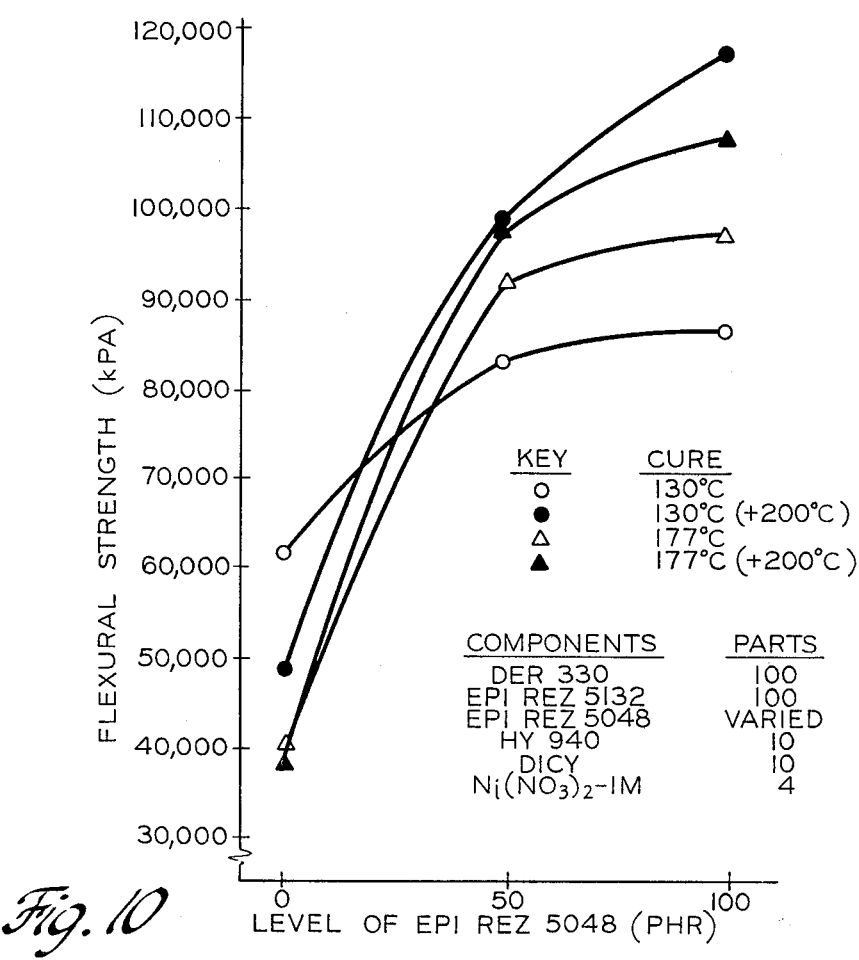

FIGS. 9 and 10 show the tensile and flexural strengths of the diluted epoxy composition as a function of Epi Rez 5048 levels. Tensile strength increased with increasing concentration of diluent, and at the high level of 100 phr the exposure to 200° C. for 1 hour actually improved the strength in comparison to the samples immediately after cure. Tensile date (FIG. 10) shows a sharp increase between 50 and 100 parts per 100 resin diluent with very little effect being observed in the 0 to 50 parts range. Again the extended exposure to 200° C. did not adversely affect the modulus properties. When the flexural strengths for the systems were measured, the major impact provided by the diluent was observed (FIG. 10). Initial strengths without diluent of 40 to 60 kiloPascal increased to 85 to 95 kiloPascal with 100 parts Epi Rez 5048 incorporated per 100 parts epoxy. Exposure to the 200° C. abusive heat cycle improved strength. With the major increases in flexural strength, however, the flexural modulus for these samples remained relatively unchanged.

In summary we have discovered a novel storage stable heat curable adhesive composition.

TABLE VIII

General Properties for DER 330/EpiRez 5132 Systems with Various Curing Agent Combinations

| Curing Agents | | | Properties (130° C.) | |
|---|---|---|---|---|
| Dicy | HY940 | Ni(NO$_3$)$_2$ Im | Lap Shear Strength (kPa) | Cure Time (min) |
| X | — | — | None | No Cure |
| — | X | — | 6,000–8,000 | 5 |
| — | — | X | 25,000–30,000 | 8 |
| X | X | — | None | No Cure |
| X | — | X | 15,000–25,000 | 4–6 |
| — | X | X | 25,000–26,000 | 6 |
| X | X | X | 36,000 | 2–3 |

Referring to Table VIII it can be seen that the incorporation of DICY, HY 940 and metal salt imidazole complex in a resin based on DGEBA flexibilized with an aromatic-fatty acid epoxy resin, and diluted with a trifunctional epoxy diluent provides a unique one part automotive adhesive system. The combined epoxy constituents are curable at 130° C. in 4 minutes or less and maintain substantially all that strength after exposure to temperatures of 200° C. The compositions all exhibit lap strengths on steel of at least 25,000 kiloPascals immediately after cure. They bond equally well to molded polymeric parts. However, the lap strengths to polymers cannot be measured in the same manner as to steel because the parts themselves fail. For example, sheet molding compound will fail at about 7,000 kiloPascals while the adhesive layer is still intact. Preferred compositional ranges for the curatives based on the several examples is from about 3 to, 10 parts DICY, about 2 to 8 parts metal salt imidazole complex based on 100 parts epoxy resin. The diethylenetriamine complex is preferably present in amounts of from about 1 to 10 percent based on the total epoxy equivalents of the composition.

While our invention has been described in terms of specific embodiments thereof, other forms may be readily adapted by one skilled in the art. Accordingly, the invention is to be limited only by the following claims.

The embodiments of the invention in which an exclusive property or privilege is claimed are defined as follows:

1. A one part epoxy adhesive suitable for use on an automotive assembly line comprising on a weight basis 100 parts of a diglycidyl ether of bisphenol A; from about 35 to 200 parts of a glycidyl ether of bisphenol A reacted with glycerol and natural oils; from about 2 to 8 parts metal salt imidazole complex per 100 parts said glycidyl ethers; from about 3 to 10 parts dicyandiamide; and from about 1 to 10 stoichiometric percent (based on the total epoxide equivalents) of

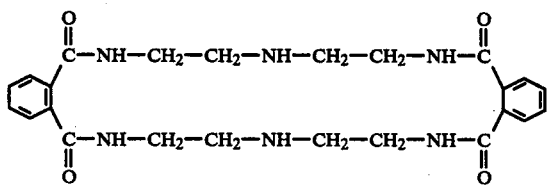

2. A one part epoxy adhesive comprising on a weight basis 100 part of a diglycidyl ether of bisphenol A flexibilized with about 35 to 200 parts of a glycidyl ether of bisphenol A reacted with glycerol and natural oils; from about 2 to 8 parts metal salt imidazole complex per 100 parts said glycidyl ethers; from about 3 to 10 parts dicyandiamide; and from about 1 to 10 stoichiometric percent (based on the total epoxide equivalents of said glycidyl ethers) of

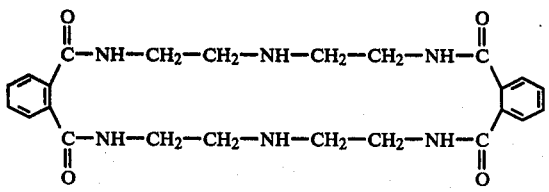

said adhesive being curable to an adhesive strength of at least about 25,000 kiloPascals measured in accordance with ASTM D1002-72 in about four minutes at 130° C., and said adhesive retaining at least about 75% of said adhesive strength after one hour at 200° C.

3. A one part epoxy adhesive suitable for use on an automotive assembly line consisting essentially on a weight basis of 100 parts of a diglycidyl ether of bisphenol A; from about 35 to 200 parts of a glycidyl ether of bisphenol A reacted with glycerol and natural oils; from about 2 to 8 parts metal salt imidazole complex per 100 parts said glycidyl ethers; from about 0 to 100 parts of a diluent for epoxy that is reactive with said glycidyl ethers having a viscosity at 25° C. of less than about 500 milliPascal seconds; from about 3 to 10 parts dicyandiamide and from about 1 to 10 stoichiometric percent (based on the total epoxide equivalents) of

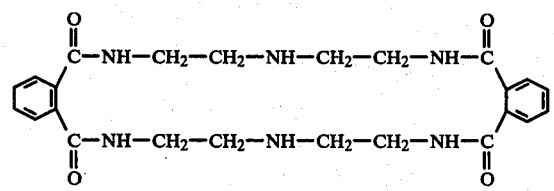

* * * * *